(No Model.)
F. WITTE.
EGG BOILER.
No. 580,815. Patented Apr. 13, 1897.
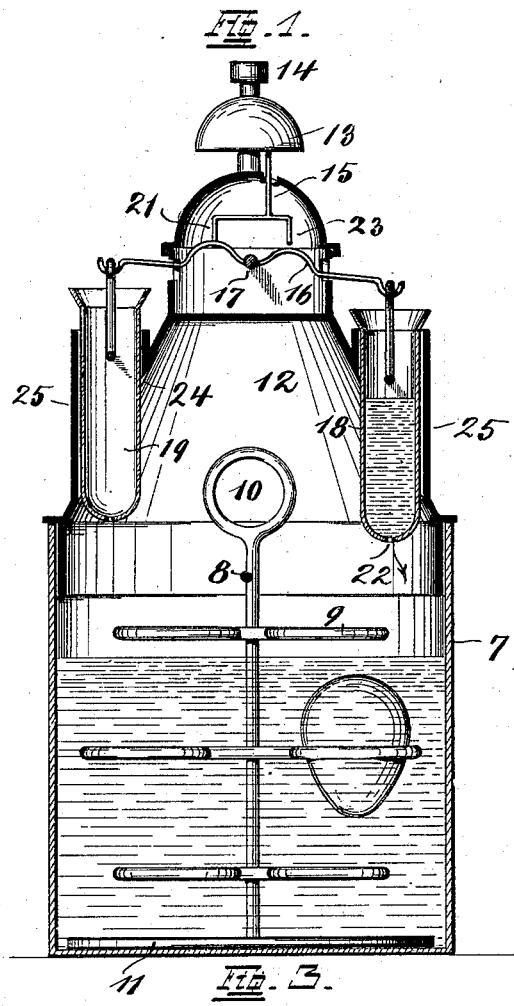
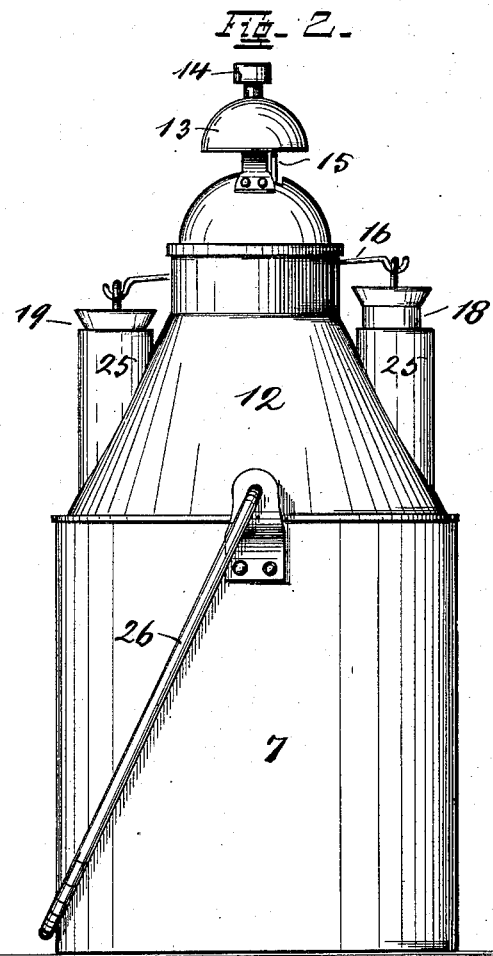
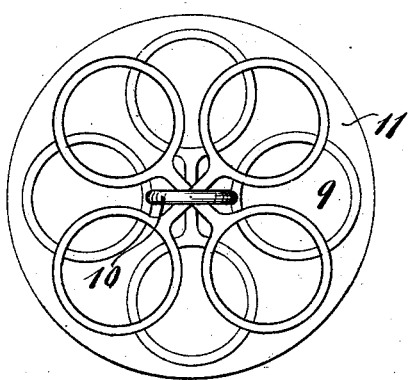
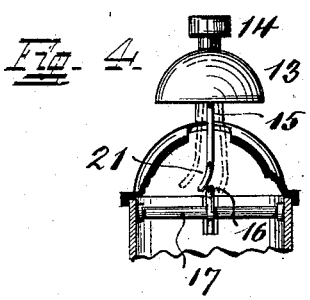
Attest
John G. Rogers
Arthur Kline
Inventor
Frank Witte
by C. Spengel Atty.

UNITED STATES PATENT OFFICE.

FRANK WITTE, OF COLLEGE HILL, OHIO.

EGG-BOILER.

SPECIFICATION forming part of Letters Patent No. 580,815, dated April 13, 1897.

Application filed April 27, 1896. Serial No. 589,242. (No model.)

*To all whom it may concern:*

Be it known that I, FRANK WITTE, a citizen of the United States, and a resident of College Hill, Hamilton county, State of Ohio, have invented a certain new and useful Egg-Boiler; and I do declare the following to be a clear, full, and exact description of the invention, such as will enable others skilled in the art to which it appertains to make and use the same, attention being called to the accompanying drawings, with the reference-numerals marked thereon, which form a part of this specification.

This invention relates to a device to be used for boiling eggs; and it comprises two parts which form the features of this invention.

The first feature is a holder on which the eggs are supported while immersed in the boiling water, whereby they may be conveniently withdrawn when done, and whereby also the shell may be cut to lay the egg open.

The other feature consists of a device which operates a signal for indicating the arrival of the proper time for withdrawing the eggs.

In the following specification and particularly pointed out in the claims is found a full description of the invention, its operation, parts, and construction, which latter is also illustrated in the accompanying drawings, in which—

Figure 1 is a vertical central section of the device complete with the egg-holder in position. Fig. 2 is a side elevation of the same. Fig. 3 is a top view of the egg-holder. Fig. 4 is a vertical section of the upper part of the device, similar to the section as shown in Fig. 1, but at right angles thereto. Fig. 5 is a detached detail view of a part of the egg-holder.

7 is a suitable vessel adapted to contain the water necessary for the cooking operation of the eggs. It receives the egg-support, which consists, substantially, of a central standard 8, which supports a number of closed rings 9, all rigidly connected and the diameter of which is such as to enable an egg to rest therein without slipping through. These rings may be arranged all in one plane connected by a suitable framework, or a smaller number may be arranged in several planes above each other, all connected to the central standard, as shown in Figs. 1 and 3. The upper end of the standard forms also the handle 10, and the height of the standard is sufficient to bring this handle above the level of the water, so that when the proper time has arrived the support may be conveniently taken hold of and with all the eggs thereon lifted out at once.

The inside or inner edge of all the rings 9, next to which the eggs rest, is serrated or dentated, as shown in Fig. 5, so that if before removal an egg is given a few turns or rotations the shell of the same will be cut, laying the inside thereof open.

The egg-holder is provided with a suitable base 11, on which it rests while the eggs are being boiled and after that when they with the holder may be placed on the table.

Vessel 7 is closed by a suitable cover 12, upon the outside of which is secured my indicating device. The indicating device in this case consists of a spring-actuated bell-signal 13, wound by a knob at 14, and is of the kind similar to those found in alarm-clocks and purchasable complete in the markets. Its bell-hammer has rigidly connected to it a downwardly-extending arm 15, which shares in the vibrations of the former when it operates for the purpose of sounding the bell. It is evident that when, on the other hand, the vibration of arm 15 is restrained the operation of the bell-hammer is also interfered with by reason of the rigid connection of the two.

16 is a lever pivoted at 17 and carrying at each of its ends a bucket, the two being numbered 18 and 19, respectively, and normally balance each other. If now bucket 18 receives a certain quantity of water, it pulls one member of lever 16 down and raises the other one to a position even with or above the lower end of a lateral extension 21, forming a rigid part of arm 15. It is plain now, especially after inspecting Fig. 4 of the drawings, that if the bell-signal be wound it could not operate, because the elevated part of lever 16 would prevent vibration of the bell-hammer of the signal because being in the path of parts 15 and 21, rigidly connected to the former and sharing in the vibrations thereof. The buckets are provided with small outlet-openings 22 in the lowest parts thereof, through which the water gradually escapes, so that after a certain time all of it has flowed out and the buckets balance again. The elevated member of lever 16 descends and by sinking below extension 21 sets it and the bell-hammer free and permits them to vibrate, whereby the latter sounds the signal.

The weight, proportion, and size of all the parts, particularly the outlet-openings in the buckets, are of course so arranged that when this incident occurs the eggs have been subjected a sufficient length of time to the action of the boiling water to be cooked to a certain predetermined degree.

The requisite quantity of water is to be poured into the bucket to be used at the same time when the eggs are set into the boiling water contained in vessel 7, and it is evident that the interval of time from this moment until the signal is sounded may be regulated either by the quantity of water contained in the buckets or by the size of the outlet-openings in them. In this case one bucket has a larger outlet-opening than the other, so that, equal quantities of water being presumed, the one bucket with the larger outlet-opening being quicker emptied would cause the signal to sound sooner, at which moment the eggs are done to a certain predetermined degree, and whenever eggs boiled in such manner are wanted this corresponding bucket is of course used.

If it is desirable that the eggs be boiled longer, the other bucket with the smaller outlet-opening is used, because it requires a longer time to empty it and a larger interval elapses before the signal sounds. Another extension (numbered 23 and similar to extension 21) is provided for such purpose, so that no matter which bucket is used that particular part of lever 16 then elevated is always capable of arresting the operation of the bell-hammer by engaging either with projection 21 or 23 thereon. This interval may also be still more subdivided by regulating the quantity of water used in either one of the buckets, or only one of these latter may be used, a proper balance-weight taking the place of the other, in which case the quantity of water would regulate the length of time which the eggs remain in the boiling water.

In order to obviate the necessity of providing a receptacle to catch the water dripping from the buckets, they are preferably suspended in a manner to be within the periphery of vessel 7 and are hung so as to reach through openings 24 in the cover 12 thereof. Casings 25 may be raised around these openings for guidance of the buckets within during their oscillations.

26 is a bail by which to handle the whole device.

Having described my invention, I claim as new—

1. In an egg-boiler, the combination with a suitable vessel adapted to receive eggs to be boiled, a spring-actuated bell-signal supported above it and a lever pivotally secured in a fixed position and subject to the action of an automatically-decreasing weight which controls the action of the signal.

2. In an egg-boiler, the combination with a suitable vessel adapted to receive eggs to be boiled, a spring-actuated bell-signal supported above it, a downward extension on the bell-hammer of the signal which vibrates with the latter, a lever pivoted and located so that when one of its arms is depressed, its elevated arm reaches within the path of the vibrating extension on the bell-hammer, thereby preventing operation of the latter for the time being, and a perforated bucket which by means of a liquid contained therein, holds the aforesaid lever in the described position until sufficiently lightened by the escaping liquid to permit the depressed part of the lever to rise.

3. In an egg-boiler, the combination with a suitable vessel adapted to receive eggs to be boiled, a spring-actuated bell-signal supported above it, a lever so supported that when one of its ends is depressed, it prevents operation of the bell-signal and a perforated bucket which when weighted by a liquid, causes the aforesaid lever to assume and retain the depression above referred to until the escaping liquid permits it to change its position.

4. In an egg-boiler, the combination with a suitable vessel adapted to receive eggs to be boiled, a spring-actuated bell-signal supported above it, the bell-hammer of which has a downward extension connected to it which shares in the vibrations of the former, a lever 16 pivoted below the bell-signal and so located that when either one of its ends is depressed, the other reaches within the path of the vibrating extension on the bell-hammer, thereby preventing operation of the latter for the time being, perforated buckets one on each end of lever 16 which normally balance each other, but change their relations and the position of lever 16 when one of them receives a certain quantity of liquid.

5. In an egg-boiler, the combination with a suitable vessel adapted to receive eggs to be boiled, a cover 12 for it, a spring-actuated bell-signal supported above it, the bell-hammer of which has a downward extension connected to it which shares in the vibrations of the former, a lever 16 pivoted below the bell-signal and so located that when either one of its ends is depressed, the other reaches within the path of the vibrating extension on the bell-hammer, thereby preventing operation of the latter for the time being, perforated buckets, one on each end of lever 16 which normally balance each other, but change their relations and the position of lever 16 when one of them receives a certain quantity of liquid, said buckets hanging within openings in cover 12 and oscillating in casings 25 raised from said openings.

In testimony whereof I hereunto affix my signature in presence of two witnesses.

FRANK WITTE.

Witnesses:
C. SPENGEL,
ARTHUR S. KLINE.